US009300498B2

(12) United States Patent
Toifl et al.

(10) Patent No.: US 9,300,498 B2
(45) Date of Patent: Mar. 29, 2016

(54) DECISION-FEEDBACK ANALYZER AND METHODS FOR OPERATING THE SAME

(71) Applicant: International Business Machines Corporation, Armonk, NY (US)

(72) Inventors: Thomas H. Toifl, Rueschlikon (CH); Hazar Yüksel, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/745,520

(22) Filed: Jun. 22, 2015

(65) Prior Publication Data
US 2015/0312063 A1 Oct. 29, 2015

Related U.S. Application Data

(63) Continuation of application No. 14/676,158, filed on Apr. 1, 2015.

(30) Foreign Application Priority Data

Apr. 24, 2015 (GB) .................................. 1407261.5

(51) Int. Cl.
*H03K 5/159* (2006.01)
*H04L 25/03* (2006.01)

(52) U.S. Cl.
CPC . *H04L 25/03057* (2013.01); *H04L 2025/03503* (2013.01)

(58) Field of Classification Search
CPC ................... H04L 25/03057; H04L 25/03049
USPC .......................... 275/233, 229; 708/322, 323
See application file for complete search history.

(56) References Cited

U.S. PATENT DOCUMENTS

| 6,018,558 | A | * | 1/2000 | Shida | 377/16 |
| 7,250,896 | B1 | * | 7/2007 | Hesener | 341/163 |
| 2013/0188656 | A1 | * | 7/2013 | Ferraiolo et al. | 370/503 |
| 2013/0243070 | A1 | * | 9/2013 | Ito et al. | 375/233 |
| 2014/0286457 | A1 | * | 9/2014 | Chaivipas | 375/329 |

OTHER PUBLICATIONS

List of IBM Patents or Patent Application Treated as Related; CH920140003US2, Date Filed: Jun. 22, 2015, pp. 1-2.
Thomas H. Toifl, et al.,"Decision-Feedback Analyzer and Methods for Operating the Same," U.S. Appl. No. 14/676,158, filed Apr. 1, 2015.

* cited by examiner

*Primary Examiner* — Khai Tran
(74) *Attorney, Agent, or Firm* — Cantor Colburn LLP; Keivan Razavi

(57) ABSTRACT

A decision-feedback equalizer for use in a receiving unit of an incoming data stream and for providing a stream of bit data outputs includes a number of comparators configured to perform a comparison related to a number of threshold values and related to a digitalized data sample and to obtain a comparison result; at least one correction block configured to receive the comparison result of a respective one of the comparators and to generate a plurality of intermediate results; and a multiplexer configured to select from the set of intermediate results depending on the output data history to provide the stream of bit data outputs.

8 Claims, 4 Drawing Sheets

DECISION-FEEDBACK ANALYZER AND METHODS FOR OPERATING THE SAME

DOMESTIC AND FOREIGN PRIORITY

This application is a continuation of U.S. patent application Ser. No. 14/676,158, filed Apr. 1, 2015, which claims priority to Great Britain Patent Application No. 14/07261.5, filed Apr. 24, 2014, and all the benefits accruing therefrom under 35 U.S.C. §119, the contents of which in its entirety are herein incorporated by reference.

BACKGROUND

The present invention generally relates to implementations of decision-feedback equalizers with improved power efficiency and reduced circuit area consumption.

Today's data networks require high-speed data communication with serial link data rates above 10 Gbits. In this bandwidth range, a further increase of serial link data rates is challenging due to the limited general bandwidth. The general bandwidth is usually determined by dielectric losses and reflections on the transmission channel which result in a widening of the transmitted signal pulses over more than one unit interval, so that the received signal is distorted by intersymbol interference.

These signal distortions are usually compensated for by means of equalizing functions in the receiving circuitry, such as feed-forward equalizing and decision-feedback equalizing. A decision-feedback equalizer (DFE) is capable of reducing signal distortions while leaving noise or cross-talk unaffected.

In general, a decision-feedback equalizer is included in the digitalized data path at an output side of an analog-digital converter and is substantially configured to compensate for the effects of one transmitted pulse onto one or more succeeding pulses of the incoming stream of digitalized data samples. The general concept of a decision-feedback equalizer implementation is to provide at least one comparator used to translate the single pulses of the stream of digitalized data samples into a bit stream. In the comparator, the digitalized data samples are each compared with a respective variable threshold value which is generated from the history of (preceding) data samples tapped from the output of the decision-feedback equalizer. The variable threshold value is obtained by delaying the bit outputs of the decision-feedback equalizer one or more times in a number of delay stages, by weighting each of the delayed bit outputs of the decision-feedback equalizer after each stage by a predetermined (preset) coefficient and by then adding the results. The coefficients are preset with respect to a standard pulse response of the specific transmission channel Particularly, the adding-up of the weighted delayed DFE outputs requires adding circuits which usually have a relatively high power and area consumption in an integrated circuit implementation.

An additional approach is to precompute the variable threshold values for each pattern of delayed DFE bit outputs to save the area and power impact of the line of adding circuits. This positive impact is diminished, however, as for each of the precomputed threshold values a separate comparator is required which also increases power and area consumption. Particularly, for a decision-feedback equalizer with N taps (N delay stages) using PAM-M (PAM: pulse amplitude modulation, wherein M indicates the number of data values transmitted by one data sample), a number of $(M \times 1) \times M^N$ comparators is required. Therefore, precomputed comparator thresholds are not suitable for significantly saving area and power consumption of an implementation of the decision-feedback equalizer.

Document US20130287089 discloses a decision-feedback equalizer with a plurality of branches each having an adder circuit for adding a feedback signal to a received input and a latch for receiving an output of the adder circuit to provide different partial bit sequences based on a clock signal and the feedback circuit. A feedback circuit includes a multiplexer for receiving as an input the different partial bit sequences from the latch of each branch, wherein the multiplexer has a clocked select input and is configured to multiplex the different partial bit sequences of each branch to assemble a full-weight bit sequence. The feedback circuit further comprises a filter for providing a cancellation of intersymbol interference from the received input to be provided to the adder circuit of each branch.

Document U.S. Pat. No. 8,451,885 discloses an integrated circuit communication device having a filter that has a plurality of taps and is operable to process the signal and to produce a filtered signal. By means of an adapted circuitry, selected taps of the filter can be selectively adjusted based on the signal quality of the filtered signal and the power consumption of the filter, wherein the adapted circuitry is operable to receive a specified power consumption threshold and to maximize the signal quality of the filtered signal by maintaining the power consumption of the filter at or below the specified power consumption threshold.

Document US20130243071 discloses a decision-feedback equalizer for setting a threshold voltage for decision comparators according to a corresponding bit history of an output of the decision-feedback equalizer. Each bit history is associated with a number of taps of the decision-feedback equalizer, wherein each decision comparator is configured to provide a bit value for a current data sample based on the corresponding bit history, wherein a latch stage is provided for latching the bit value of each decision comparator. The decision-feedback equalizer has a set of interleave groups for determining a bit value of a corresponding sample in a window of samples, wherein each of the taps corresponds to a feedback path between adjacent interleave groups. By means of a multiplexing logic, a bit value of an associated one of the taps can be predictively selected based on a value of a corresponding select line in a previous interleave.

Document US20130243070 discloses a method for adapting one or more taps of a decision-feedback equalizer of a receiver, wherein a reference voltage for each of one or more data recovery comparators is set to a corresponding predetermined initial value. A bit value for each sample of a received signal is generated by one or more of the data recovery comparators. A window of a number of received bit samples is selected, a detected number of bits of the same logic values are tracked for each of the one or more data recovery comparators and, based on the ratio of the detected numbers, the reference voltage for the corresponding data recovery comparator is adjusted by a predetermined step amount.

Document U.S. Pat. No. 8,102,906 discloses an equalizer circuit with a number of data paths, each comprising a sensing circuitry for receiving a signal corresponding to a sequence of data digits, wherein the sensing circuitry issues at least two inputs indicative of the relative magnitude of data digits, and a multiplexer that selectively couples one of the at least two outputs to a data path output. The multiplexer in a second of the data paths is controlled, at least in part, by the output of the multiplexer in a first of the data paths, and the multiplexer in a third of the data paths is controlled, at least in part, by the output of the multiplexer in the second data path.

SUMMARY

In one embodiment, a decision-feedback equalizer for use in a receiving unit of an incoming data stream and for providing a stream of bit data outputs includes a number of comparators configured to perform a comparison related to a number of threshold values and related to a digitalized data sample and to obtain a comparison result; at least one correction block configured to receive the comparison result of a respective one of the comparators and to generate a plurality of intermediate results; and a multiplexer configured to select from the set of intermediate results depending on the output data history to provide the stream of bit data outputs.

In another embodiment, a method for decision-feedback equalization for use in a receiving unit of an incoming data stream and for providing a stream of bit data outputs includes performing a comparison related to a number of provided threshold values and related to a provided digitalized data sample, and obtaining a comparison result; receiving the comparison result of a respective one of the comparisons to generate a plurality of intermediate results; and multiplexing from the set of intermediate results depending on the output data history to provide the stream of bit data outputs.

BRIEF DESCRIPTION OF THE DRAWINGS

Embodiments are described in more detail in conjunction with the accompanying drawings, in which.

DETAILED DESCRIPTION

Figure 1:
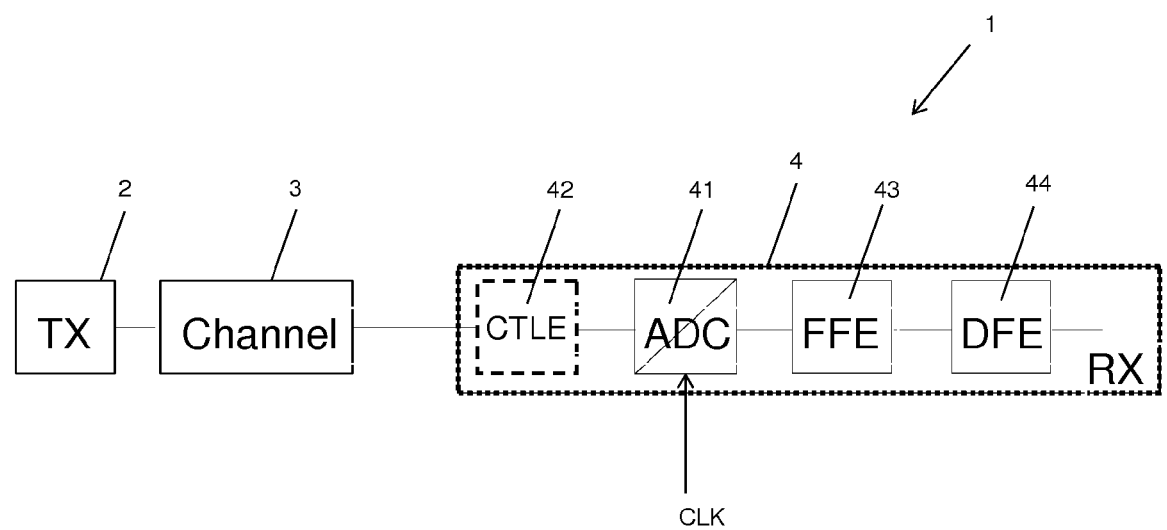
FIG. 1 schematically shows a receiving unit for receiving a high-speed data stream using an analog-digital converter and a decision-feedback equalizer.

In view of the above, it would be desirable to provide a decision-feedback equalizer which can be implemented by an integrated circuit having low power and area consumption.

According to an embodiment, a decision-feedback equalizer for use in a receiving unit of an incoming data stream and for providing a stream of bit data outputs includes a number of comparators for performing a comparison related to a number of threshold values and related to a digitalized data sample and for obtaining a comparison result; at least one correction block for receiving the comparison result of a respective one of the comparators and for generating a plurality of intermediate results; and a multiplexer for selecting from the set of intermediate results depending on the output data history to provide the stream of bit data outputs.

One idea of a decision-feedback equalizer according to an embodiment of the invention is based on a precomputation of a sum of preceding bit data outputs of the decision-feedback equalizer weighted by coefficients to obtain the threshold values for evaluating the actual data sample in a comparison. As the patterns provided by a bit data output sequence of the decision-feedback equalizer is limited to $M^N$ for an N-tap decision-feedback equalizer with PAM-M (M: number of discrimination levels), the precalculations of the summed-up coefficient-weighted bit data outputs can be pre-stored and e. g. provided in a look-up table or the like, so that an online adding process can be omitted.

Such an approach, however, may require an increased number of comparators, i.e., one comparator for each precalculated threshold value. To further reduce the number of comparators necessary for each of the entries of the look-up table, a redundancy may be used concerning the threshold values associated to the pattern of bit data output sequences. Particularly, bit-inverted patterns of bit data output sequences may be generally associated to sign-inverted threshold values having the same absolute value. Applying this scheme, the number of comparators can be reduced by using each absolute value of the threshold values only once, so that a reduced number of patterns of bit data output sequences can be considered. Hence, a number of patterns of output bit data sequences are associated to at least some of the threshold values.

Consequently, according to an embodiment, a value related to the actual digitalized data sample is compared with values related to each of the provided threshold values, and multiple intermediate results, from which a selection is made in the multiplexer, are generated in a correction block. This allows for reducing the number of comparators by at least half, while the additional circuitry of the correction block(s) can be implemented with a very low power and area consumption.

Therefore, the concept of holding a reduced number of the precomputed threshold values, i.e., the added coefficient-weighted previous bit data output sequence for each possible pattern of bit data output sequences, leads to a reduction in the number of comparators which usually have a significant area and power consumption. Hence, the area and power consumption of an integrated circuit implementation of the decision-feedback equalizer can be significantly reduced.

Furthermore, a correction block may be provided for each of the number of comparators each generating a plurality of intermediate results, wherein particularly the number of intermediate results is two.

It may be provided that the output data history corresponds to a pattern of one or more subsequently obtained bit data outputs of the multiplexer.

Moreover, a threshold value memory may be provided for supplying the threshold values, wherein at least one of the threshold values is associated to a plurality of patterns of the output data history.

According to an embodiment, the threshold values stored in the threshold value memory may be different from one another.

Particularly, the threshold values stored in the threshold value memory may be determined by transmission channel characteristics. Hence the characteristics of the decision-feedback equalizer can be adapted to the characteristics of the transmission system.

To each of the number of comparators may be associated a first absolute value block for applying an absolute value of the respective threshold value to the comparator and a second absolute value block for applying an absolute value of the digitalized data sample to each of the comparators.

It may be provided that each of the at least one correction blocks is configured to generate the number of intermediate results depending on the sign of the respective threshold value, on the sign of the digitalized data sample and on the comparison result.

The correction block may be configured to generate a number of intermediate results one of which corresponds to a comparison result between the threshold value and the sample data and another one of which corresponds to a comparison result between the negated threshold value and the sample data.

According to an embodiment of a further aspect, a receiving unit is provided, including an analog-digital converter for providing digitalized sample data; and the decision-feedback equalizer.

According to an embodiment of a further aspect, a method for decision-feedback equalization for use in a receiving unit of an incoming data stream and for providing a stream of bit data outputs is provided, the method including: performing a comparison related to a number of provided threshold values and related to a provided digitalized data sample and obtaining a comparison result; receiving the comparison result of a respective one of the comparisons to generate a plurality of intermediate results; and multiplexing from the set of intermediate results depending on the output data history to provide the stream of bit data outputs.

In the following, a decision-feedback equalizer to be implemented as an integrated circuit is disclosed. The decision-feedback equalization substantially compensates and mitigates intersymbol interferences and/or DC creep in a data stream received across a communication channel which have been digitized to obtain data samples for further evaluation into binary data.

In detail, FIG. 1 illustrates a transmission system 1 having a transmission unit 2 which is configured to transmit a serial data stream over a transmission channel 3 to be received by a receiving unit 4. The data stream is received by an analog-digital converter 41 directly or optionally via an analog equalizer 42, which is known from the art and thus not further referred to herein.

The analog-digital converter 41 samples the incoming data stream in response to a provided or recovered clock signal CLK which may be recovered from the received data stream. Clock recovery techniques are also well-known in the art and thus not further referred to herein.

In general, the bandwidth of the transmission channel 3 may be reduced by dielectric losses and reflections due to impedance discontinuities. In the time domain, the limited channel bandwidth results in a broadening of the transmitted signal pulses over more than one unit interval, so that the signal received at the analog-digital converter 41 is distorted by intersymbol interferences.

The common method for compensating for signal distortions caused by the limited channel bandwidth are equalization functions which may be implemented in a feed-forward equalizer 43 and a decision-feedback equalizer 44. Decision-feedback equalizers are usually well suited for flattening the general response, thereby reducing signal distortions.

Figure 2:
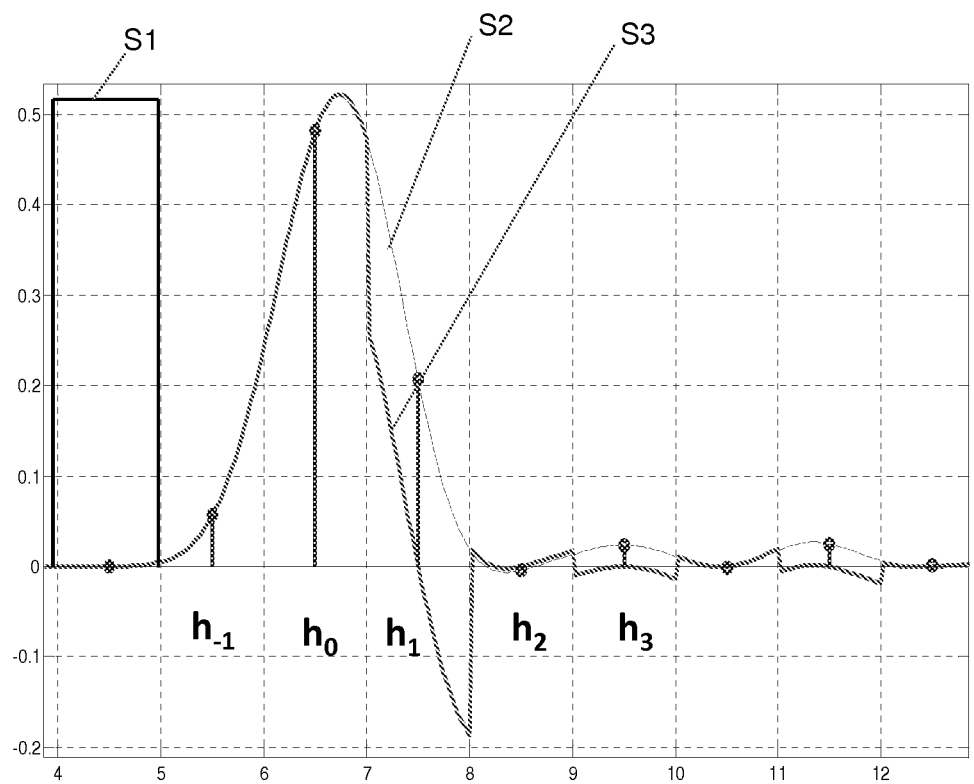
FIG. 2 shows a diagram for illustrating an impulse response before and after a decision-feedback equalization.

FIG. 2 shows an exemplary portion of a received data stream with one signal impulse on an input side of the analog-digital converter 41, resulting digitalized data samples on the output side of the analog-digital converter 41 and characteristics resulting after the compensation by means of decision-feedback equalization. It can be seen that for an exemplary data pulse, as shown in the waveform S1 of a rectangular data pulse provided on the transmitting side, the signal response after transmission through the transmission channel 3 is shown as the waveform S2 of the received analog signal. It can further be seen that, compared to the original data pulse, the received signal is broadened due to dielectric losses and results in signal variations following the broadened impulse caused by reflections due to impedance discontinuities. Sampling by the analog-digital converter 41 occurs at sampling times determined by the provided clock signal CLK.

The values of the sampled data are indicated relative to the cursor indicating the sampling value $h_0$ of a main pulse portion of the transmitted signal, followed by more sampling values $h_1$ to $h_n$ (first to $n^{th}$ post-cursor) which are related to the respective transmitted data pulse and are caused by the signal distortion on the transmission channel 3 due to the respective transmitted data pulse. Due to the broadening of the impulse response of the transmission channel 3, a signal distortion caused by the respective transmitted data pulse can also be observed one clock cycle before the actual sampling of the main pulse portion (main cursor). The sampling value thereof is designated as pre-cursor $h_{-1}$. The purpose of decision-feedback equalization is to reduce the post-cursor intersymbol interferences to 0 at their respective sampling times. The result of such decision-feedback equalization is indicated by the equalized signal characteristics S3.

Figure 3:
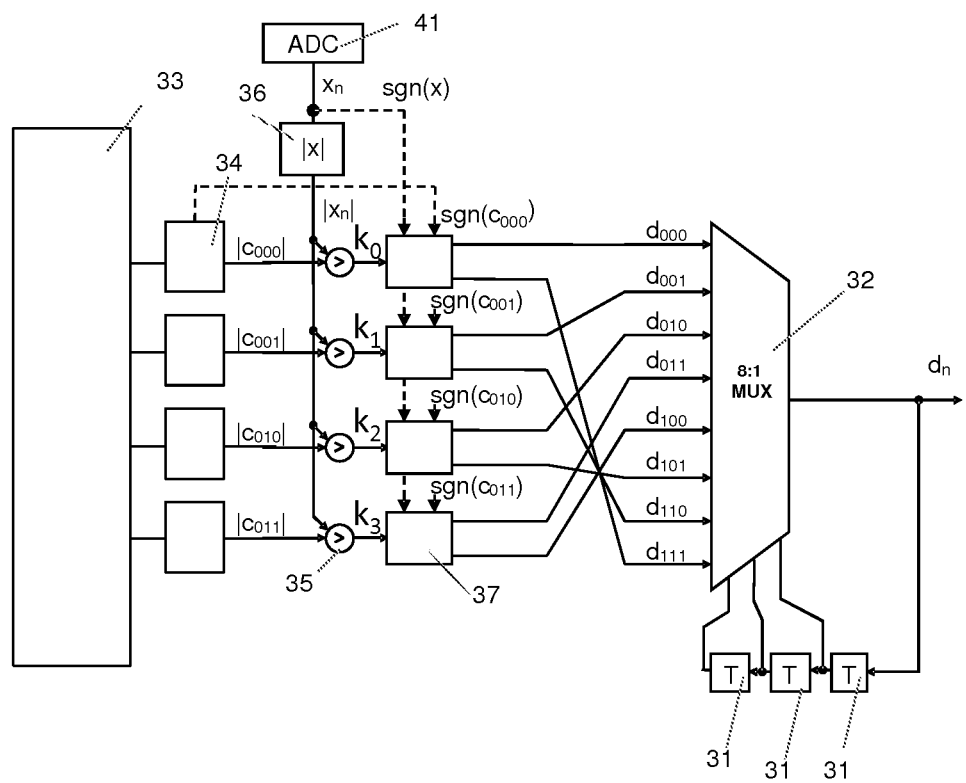
FIG. 3 shows a schematic block diagram of a decision-feedback equalizer having a reduced number of comparators.

In FIG. 3, a block diagram schematically shows an implementation of a decision-feedback equalizer 44 which can be implemented as an integrated circuit having reduced area and power consumption. The decision-feedback equalizer 44 is used in the form of its input digitalized data sample $x_n$ (index n: clock counter value) which is provided by the analog-digital converter 41 and may be equalized by means of the feed-forward equalizer 43. The data samples $x_n$ are decision-feedback equalized to obtain a bit data output $d_n$ at an output of the decision-feedback equalizer 44 as an output data sequence of subsequent bit data. Hence, the decision-feedback equalizer 44 performs an equalization and a bit interpretation of the stream of data samples $x_n$.

The bit data output $d_n$ is delayed by one or more delay stages 31, each of which provides a delay of about one sampling clock cycle used to sample the transmitted data stream by the analog-digital converter 41. In the present embodiment, the number of delay stages 31 is three, but can generally be any number N. At each of the delay stages 31, the delayed output data is tapped and supplied to a respective multiplexer 32 for selecting intermediate results $r_{000}, r_{001}, r_{010}, \ldots, r_{110}, r_{111}$ provided. The number N of delay taps, i.e. the number of subsequently delayed bit data outputs, is referred to as output data history which is described as an output data history pattern $d_{n-3}, d_{n-2}, d_{n-1}$ (for a number of 3 delay taps). The multiplexer 32 has a number of $2^N$ (=8, for N=3) inputs for receiving sign-corrected comparison results and for selecting a bit data output therefrom.

It is the concept of decision-feedback equalization to consider the impact of previous data on the evaluation the actual data sample. This is achieved by evaluating the data sample with respect to a threshold value in a comparison.

The threshold values c are precomputed and stored in a threshold value memory 33. In the threshold value memory 33, at least one of the threshold values is associated with two or more output data histories. Given the post-cursors $h_1, h_2, \ldots h_n$ as coefficients describing the transmission channel characteristics with respect to an impulse response, the threshold values $c_{xxxxx}$, e.g., for a five tap decision-feedback equalizer 44, are calculated as follows:

$$c_{abcde} = (-1)^a h_1 + (-1)^b h_2 + (-1)^c h_3 + (-1)^d h_4 + (-1)^e h_5,$$

with a, b, c, d, e ... $\in \{0, 1\}$ and n=5.

In a general form:

$$c_{b1,b2,\ldots,bi} = \sum_{i=1\ldots n} (-1)^i h_i,$$

with b1, b2, ..., bi ... $\in \{0,1\}$ (preceding bit outputs of the DFE) and i corresponding to the number of taps.

It can be seen that the absolute values of the threshold values resulting from above formula are the same for each pair of mutually inverse patterns of the data output history.

For instance, the absolute value of the threshold value for $c_{01010}$) (=$h_1-h_2+h_3-h_4+h_5$) and the absolute value of the threshold value for $c_{10101}$ (=$-h_1+h_2-h_3+h_4-h_5$) are the same.

With respect to all possible output data histories, at least two of the thus obtained threshold values will have an identical absolute value. In special cases also more than two threshold values will have an identical absolute value, for instance in case of $h_4=h_3+h_5$. Hence, for each absolute value among the whole set of obtained threshold values, a respective threshold value output $c_{xxx}$ (for a 3-tap DFE) (which does not necessarily have a positive sign) is associated to two or more patterns of output data histories.

The respective threshold value outputs $c_{xxx}$ of the threshold value memory 33 are permanently provided. Each threshold value output $c_{xxx}$ is applied to a respective first absolute value block 34 which determines the absolute value of the respective threshold value output $|c_{xxx}|$ and the sign SGN ($c_{xxx}$) thereof. The absolute values $|c_{xxx}|$ of the threshold value outputs $c_{xxx}$ are respectively supplied to a first input of a respective comparator 35.

Furthermore, a second absolute value block 36 is provided which determines the absolute value $|x_n|$ of the incoming data sample $x_n$ and provides it to the second inputs of each of the comparators 35. Hence, the comparison of the absolute value $|x_n|$ of the sample data $x_n$ is compared with the absolute value of the respective threshold values provided by the threshold value memory 33 to obtain a comparison result $k_0 \ldots k_3$, respectively, as outputs of the comparators 35.

The outputs $k_0 \ldots k_3$ of the comparators 35 are respectively coupled to a respective correction block 37, each of which includes a logic to correct the comparison result with respect to the signs of threshold value and data sample. Each of the correction blocks 37 has two outputs which are applied to two respective inputs of the multiplexer 32.

Each correction block 37 has two 2:1 multiplexing blocks 38, 39 to provide a first intermediate data bit $d_{i1}$ and the second intermediate data bit $d_{i2}$ to two inputs of the multiplexer 32, respectively. In this manner, eight inputs of the multiplexer 32 are supplied by the two outputs of each of the four correction blocks 37, respectively. The multiplexer 32 receives the output data history as a selecting input, so that—depending on the bit pattern—one of the outputs of the four correction blocks 37 is selected as the bit data output of the decision-feedback equalizer 44.

Figure 4:
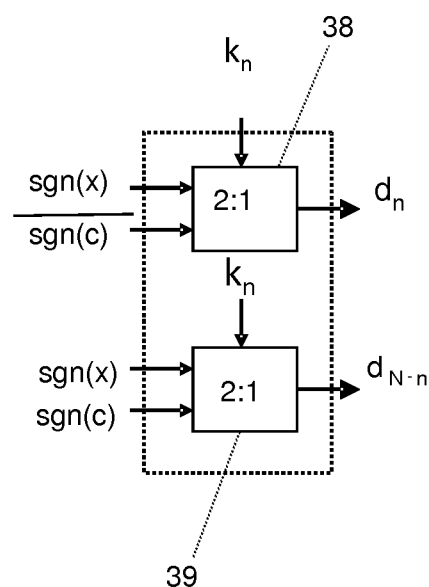
FIG. 4 shows a more detailed block diagram of a correction block.

As shown in FIG. 4 in more detail, each correction block 37 receives as input the sign value SGN ($x_n$) of the incoming sample data $x_n$, the sign value SGN ($c_{xxx}$) of the threshold value $c_{xxx}$ provided by the threshold value memory 33 and an inverted sign $\overline{SGN(cxxx)}$ of the respective coefficient SGN ($c_{xxx}$).

In a first multiplexing block 38, the sign value SGN ($x_n$) of the sample data $x_n$ is selected as the respective one of the intermediate results $r_{000}, r_{001}, r_{010}, \ldots, r_{110}, r_{111}$ if the comparison result $k_0 \ldots k_3$ indicates that the absolute value $|x_n|$ of the sample data $x_n$ is larger than the absolute value $|c_{xxx}|$ of the respective threshold value $c_{xxx}$. The inverted sign value SGN ($c_{xxx}$) of the respective threshold value $c_{xxx}$ is selected as the respective one of the intermediate results $r_{000}, r_{001}, r_{010}), \ldots, r_{110}, r_{111}$ in case the absolute value $|c_{xxx}|$ of the respective threshold value $c_{xxx}$ is larger than the absolute value $|x_n|$ of the data sample $x_n$.

In a second multiplexing block 39, the sign value SGN ($x_n$) of the sample data $x_n$ is selected as the respective one of the intermediate results $r_{000}, r_{001}, r_{010}, \ldots, r_{110}, r_{111}$ if the comparison result $k_0 \ldots k_3$ indicates that the absolute value $|x_n|$ of the sample data $x_n$ is larger than the absolute value $|c_{xxx}|$ of the respective threshold value $c_{xxx}$. The sign value SGN ($c_{xxx}$) of the respective threshold value $c_{xxx}$ is selected as the respective one of the intermediate results $r_{000}, r_{001}, r_{010}, \ldots, r_{110}, r_{111}$ in case the absolute value $|c_{xxx}|$ of the respective threshold value $c_{xxx}$ is larger than the absolute value $|x_n|$ of the data sample $x_n$.

While the present embodiment is described using a 3-tap decision-feedback equalizer 44 having a PAM-2 modulation, which results in a need of a 8:1 multiplexer 32 for selecting from one of eight intermediate results $r_{000}, r_{001}, r_{010}, \ldots, r_{110}, r_{111}$, the decision-feedback equalizer 44 can be generalized to a PAM-M decision-feedback equalizer having a number of N taps. For each of the thus calculated absolute values of threshold values, a comparator 35 associated to one of the threshold values needs to be provided.

REFERENCE LIST 1 transmission system
2 transmission unit
3 transmission channel
4 receiving unit
41 analog-digital converter
42 analog equalizer
43 feed-forward equalizer
44 decision-feedback equalizer
31 delay stage
32 multiplexer
33 threshold value memory
34 first absolute value block
35 comparator
36 second absolute value block
37 correction block
38 first multiplexing block
39 second multiplexing block

The invention claimed is:

1. A method for decision-feedback equalization for use in a receiving unit of an incoming data stream and for providing a stream of bit data outputs, the method comprising:
performing a comparison related to a number of provided threshold values and related to a provided digitalized data sample, and obtaining a comparison result;
receiving the comparison result of a respective one of the comparisons to generate a plurality of intermediate results; and
multiplexing from the set of intermediate results depending on an output data history to provide the stream of bit data outputs wherein a threshold value memory supplies the threshold values, wherein at least one of the threshold values is associated to a plurality of patterns of the output data history.

2. The method of claim 1, further comprising providing, for each of the number of comparators, a correction block, each generating a plurality of intermediate results, wherein the number of intermediate results is two.

3. The method of claim 1, wherein the output data history corresponds to a pattern of en two or more subsequently obtained data outputs of the multiplexer.

4. The method of claim 1, wherein the threshold values stored in the threshold value memory are different from one another.

5. The method of claim 1, wherein the threshold values stored in the threshold value memory are determined by transmission channel characteristics.

6. The method of claim 1, further comprising:
applying, with a first absolute value block associated with each of the number of comparators, an absolute value of the respective threshold value to the comparator; and applying, with a second absolute value block, an absolute value of the digitalized sample data to each of the comparators.

7. The method of claim 6, wherein each of the at least one correction blocks is configured to generate the number of intermediate results depending on the sign of the respective threshold value, on the sign of the digitalized data sample and on the comparison result.

8. The method of claim 6, wherein the correction block is configured to generate a number of intermediate results one of which corresponds to a comparison result between the threshold value and the digitalized data sample and another one of which corresponds to a comparison result between the negated threshold value and the digitalized data sample.

* * * * *